Feb. 26, 1929.  1,703,549
G. SERGEEFF
TOOL ARRANGEMENT
Filed April 19, 1927   2 Sheets-Sheet 2
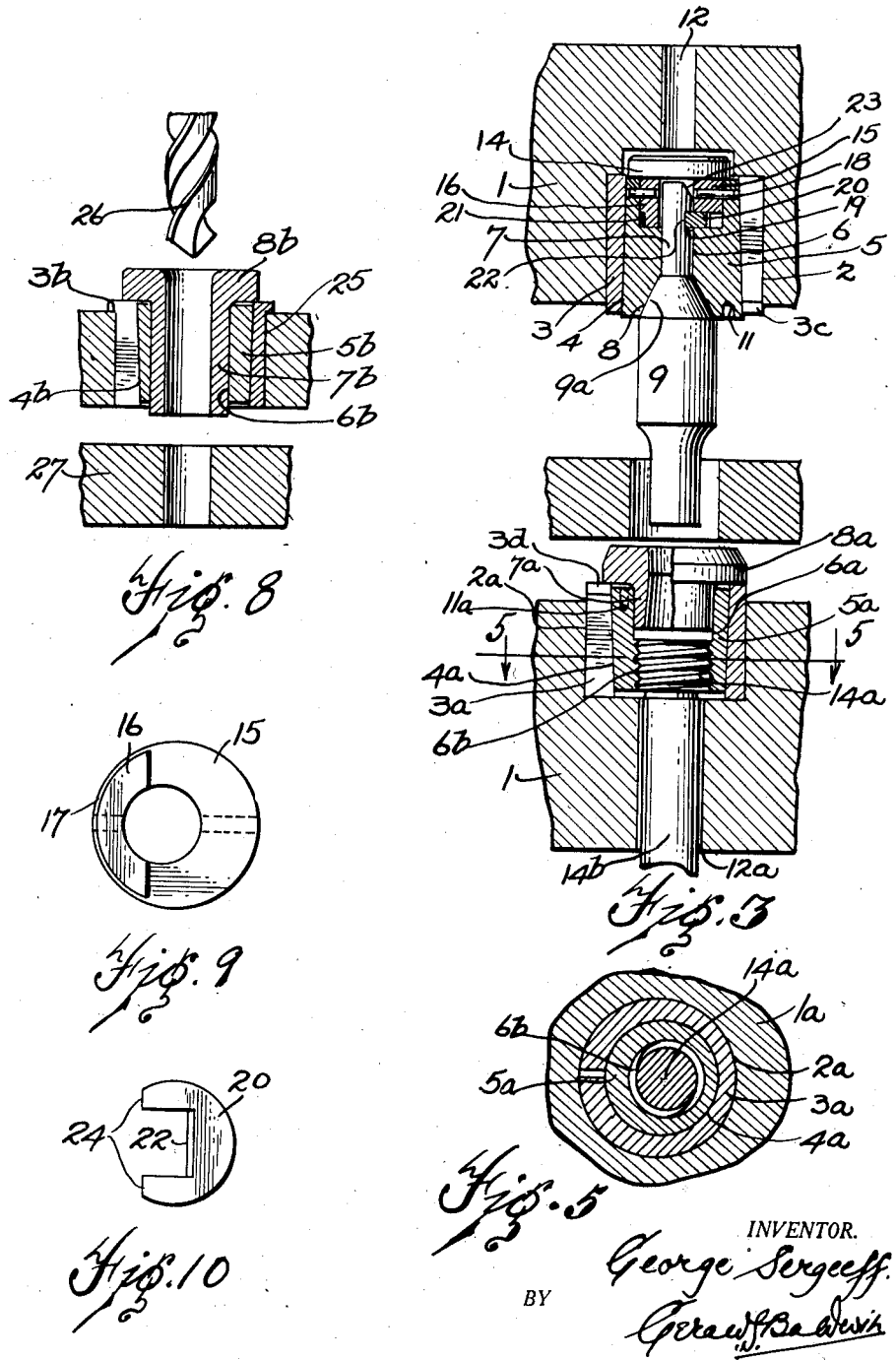

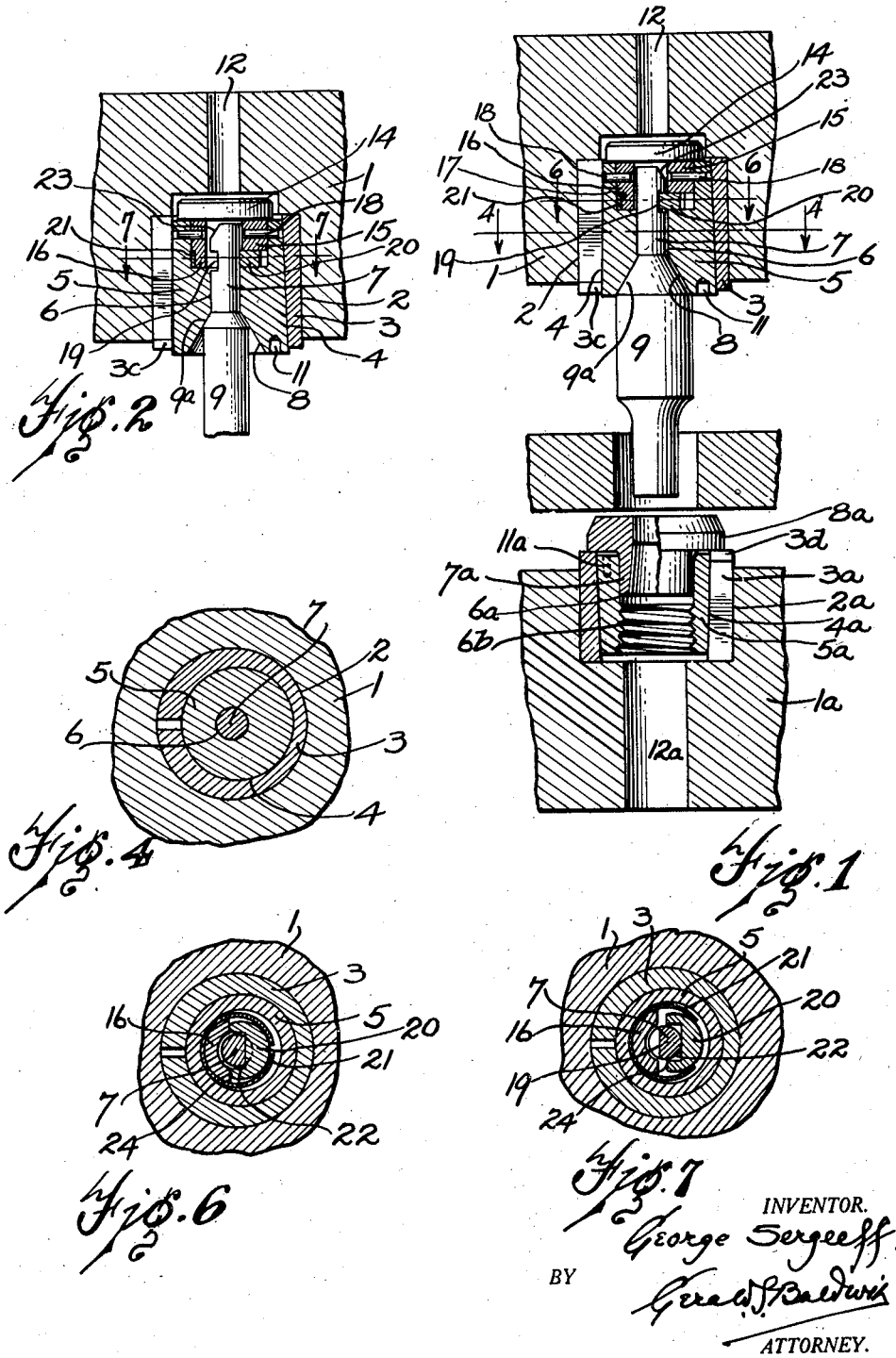

Patented Feb. 26, 1929.

1,703,549

UNITED STATES PATENT OFFICE.

GEORGE SERGEEFF, OF DETROIT, MICHIGAN.

TOOL ARRANGEMENT.

Application filed April 19, 1927. Serial No. 184,898.

This invention relates to improvements in tool arrangements; one of the objects of the invention is to provide a tool arrangement for dies wherein the latter can be moved to a limited extent in any direction at right angles to their axes. This adjustability, when there are a plurality of dies in one shoe or die plate, eliminates the necessity of such accurate boring and reaming of the shoes or die plates. Again lateral adjustment and resetting of dies is thereby made possible in a short time, whereas this could only be accomplished with extreme difficulty with ordinary dies. For dies must be set within very close limits with respect to one another, and the lateral adjustability of tools constructed according to this invention eliminates a great deal of skilled labor which requires considerable time for its accomplishment.

Another object of the invention is to provide a tool arrangement for a die having holding means for the die itself so constructed that the latter may be simply and easily inserted into or removed from its supporting parts at any time. Moreover the supporting parts may also be so constructed that they will satisfactorily hold dies of various sizes; and again the supporting parts themselves can be readily removed from their shoe or die plate and others readily substituted if desired.

A further object of the invention is to provide a tool arrangement which can also be applied to drilling jig bushings, so that the latter may be moved with respect to one another at right angles to their axes in any direction, thereby facilitating lateral adjustment, and simplifying accurate manufacture.

Having thus broadly outlined the major objects of the invention, I will now proceed to describe embodiments thereof, with the aid of the accompanying drawings, in which both upper and lower die parts, hereinafter referred to as punches and matrixes respectively, are shown supported thereby, and also showing the adaptation of the invention to drilling jigs.

In the drawings:

Figure 1 illustrates a sectional elevation of the tool arrangement with a punch and matrix concentrically supported in their shoes.

Figure 2 shows a similar view of the upper tool arrangement with a smaller punch supported thereby and the latter turned through one hundred and eighty degrees.

Figure 3 shows a similar view with the tool parts so turned that the punch and matrix are eccentric in their shoes.

Figure 4 is a section on the line 4—4 of Figure 1.

Figure 5 is a section on the line 5—5 of Figure 3.

Figures 6 and 7 are sections on the lines 6—6 and 7—7 of Figures 1 and 2 respectively.

Figure 8 shows the application of the tool arrangement to a drilling jig bushing.

Figures 9 and 10 are details.

Referring to the drawings, 1 designates an upper shoe having a substantially circular hole 2 therein of uniform diameter throughout its depth. In this hole a split sleeve 3 having a tapered eccentric bore 4 is placed. A tapered socket 5 is positioned in the said eccentric bore 4, and the socket is in turn provided with an eccentric opening 6 therein to receive the punch shank 7. The outer end of the socket is preferably provided with a conical bearing surface 8 to coact with a similarly shaped end 9ª of the punch body 9. In this manner the socket provides bearing surface for the upper ends of punch bodies of various sizes as shown in Figures 1 and 2, and evenly transmits upward pressure exerted on the punch to the socket which is in turn forced more firmly into engagement with the sleeve 3.

It will be noted that the eccentricity of the opening 6 in the socket 5 is preferably equal to the eccentricity of the bore 4 in the sleeve 3, so that the sleeve and socket can be so turned with respect to one another that the eccentricity of the sleeve bore offsets the eccentricity of the socket opening, thereby bringing the shank of the punch concentric with the hole 2 in the upper shoe. Again the sleeve and socket may be so turned with respect to one another that the punch shank may be set at any desired eccentricity to the hole 2, and in any direction, until the distance between the axes of the hole 2 and the punch shank is equal to twice the eccentricity of either the sleeve bore with regard to the periphery of the sleeve, or the socket opening with regard to the periphery of the socket.

Similarly in the lower shoe 1ª is a hole 2ª having a split sleeve 3ª therein, the bore 4ª of which latter is tapered and eccentric. This bore 4ª receives a socket 5ª which has its periphery so tapered that it will cooperate with the bore 4ª, and the socket has an eccentric opening 6ª therein to receive the shank 7ª of the matrix 8ª.

The split sleeve 3, or 3ª, usually has an enlarged slot 3ᶜ, or 3ᵈ, at the outer end of its split so that a wrench may be applied thereto to turn it; and similarly holes 11, or 11ª, are generally provided in the outer end of the socket 5, or 5ª, in order that the latter may be readily turned.

A passage 12, or 12ª may be provided from the inner end of the hole 2, or 2ª, to the opposite side of the shoe 1, or 1ª. In the case of the socket 5 a knock-out plate 14 bears on the inner end of the socket so that by striking the plate the socket may be driven out of engagement with the tapered bore 4 of the sleeve 3. And in the case of the socket 5ª the latter is usually provided with an internally threaded portion 6ᵇ of reduced diameter below the shank 7ª. This threaded portion is adapted to receive the enlarged threaded end 14ª of the knock-out punch 14ᵇ after the shank 7ª of the matrix 8ª has been removed from the opening 6ª. So that by striking the end of the punch 14ᵇ the socket 5ª may be driven out of the tapered bore 4ª of the sleeve 3ª.

In the inner end of the socket 5 is a counterbore to receive a substantially circular member 15 having a downwardly projecting apron 16 around the lower portion of which latter is a groove 17. The member 15 usually terminates at its upper end substantially flush with the upper end of the socket and is held in position in the latter as by radially disposed pins 18 which pass through the upper annular portion of the socket. The shank 7 has a transverse slot 19 cut in it intermediately of its length, and 20 designates a latch positioned under the member 15. Around the groove 17 and the latch 20 is a spring 21 which forces the bearing surface 22 of the latch into engagement with the slot 19 as soon as the shank is so positioned that the latch bearing surface can engage it. In order to facilitate the insertion of the shank 7 into the opening 6 the upper end of the former may be bevelled towards the side in which the slot 19 occurs as indicated at 23, as this bevelled portion forces the latch gradually back against the tension of the spring 21 as the shank is pushed upwards in the socket, and as the slot in the shank comes opposite the latch the bearing surface of the latter is moved into engagement with it by the said spring. In order to remove the punch it is only necessary to turn it until the slot is free of the latch, and the latter is forced back by the periphery of the shank against the tension of the spring. When this has been done the punch is free to be withdrawn. It will be noted that the sides 24 of the latch bear against the apron 16 when the latch is in engaging position, so that the latter is prevented from turning independently of the socket.

Referring now to Figure 8, it will be noted that the general arrangement is almost identical with the arrangement of the matrix 8ª. The jig is provided with a plurality of holes, one of which 25 is shown. Into the latter a split sleeve 3ᵇ is inserted. The bore of the latter is eccentric and tapered to receive a socket 5ᵇ, the periphery of which latter is correspondingly tapered. This socket has an eccentric opening 6ᵇ therein to receive the shank 7ᵇ of the bushing 8ᵇ. The bore of the latter is preferably concentric with the periphery of the shank, and the opening 6ᵇ in the socket is preferably uniform throughout its length. Obviously adjustment of the bushing at right angles to its axis is obtained by turning the sleeve 3ᵇ and the socket 5ᵇ either independently or together. 26 and 27 designate a drill and the work respectively.

The method of adjusting tool laterally is to turn the sleeve and socket either together or independently before the socket is driven up tight into the sleeve in the positions shown in the drawings.

From the foregoing it is believed that the method of construction and application of the tool arrangement will be readily understood. Moreover while the preferred arrangement and applications of the invention have been described and shown it is understood that modifications may be made therein both with regard to the specific tools shown and also to enable this tool arrangement to be applied to other specific uses.

What I claim is:

1. In a tool arrangement, the combination of a socket member having an opening therethrough, said socket member being counterbored from end, a member fixed in said counterbore having a depending apron, a tool, a shank on said tool in said opening having a slot substantially at right angles to its axis, a latch in said socket movable substantially at right angles to the axis of the latter, said apron preventing rotation of said latch in said socket, and spring means tending to hold said latch in said socket slot.

2. In a tool arrangement, the combination with a plate having a hole therein, of a split sleeve in said hole having an eccentric tapered bore, a socket having its periphery tapered to coact with said bore and having an eccentric opening therein the axis of which is parallel with the axis of said sleeve bore, said eccentric opening being countersunk at its lower end, a tool, a shank on said tool taking into said sleeve opening, the end of said tool adjacent to its shank being tapered to coact with said countersunk socket portion so that pressure against the operating end of said tool exerts upward pressure on said socket forcing it into closer contact with the sleeve bore and causing the sleeve to expand and grip the wall of the hole in the plate, and means at the exposed end of the sleeve and socket for turning them to set the eccentricity of said tool and the direction of said eccentricity with regard to the hole in said plate.

3. In a tool arrangement, the combination with a plate having a larger hole therein, and a smaller hole connecting the larger hole with the opposite side of said plate, of a split sleeve in said larger hole having an eccentric tapered bore, a socket in said bore having its periphery tapered to coact with it and an eccentric opening therein the axis of which is parallel with the axis of said sleeve periphery, said eccentric opening being countersunk at its lower end, a plate resting on said socket and extending over said socket opening under the smaller hole in the plate so as to provide a striking surface for the removal of said socket, a tool, a shank on said tool taking into said sleeve opening, the end of the tool adjacent to its shank being tapered to cooperate with said countersunk socket portion so that pressure against the operating end of said tool exerts upward pressure on said socket forcing it into closer contact with the sleeve bore and causing the sleeve to expand and grip the wall of the larger hole in the plate, and means for turning said sleeve and socket at their lower exposed ends so as to set the eccentricity of said tool and the direction of said eccentricity with regard to the hole in the split sleeve.

GEORGE SERGEEFF.